Patented Aug. 31, 1948

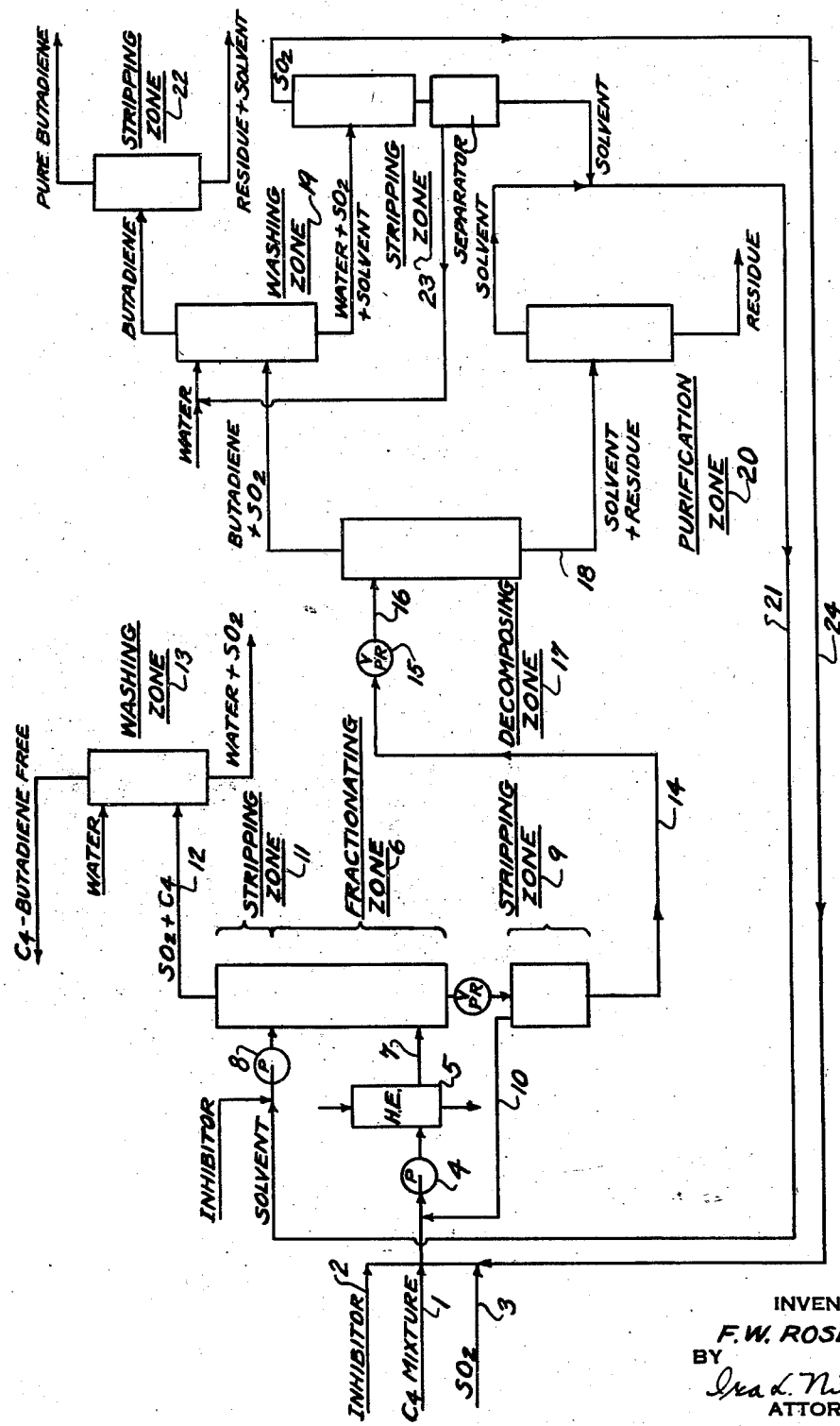

2,448,053

UNITED STATES PATENT OFFICE 2,448,053

CYCLIC SULFONES OF CONJUGATED DIENES

Frank William Rose, Jr., Media, Pa., assignor to Houdry Process Corporation, Wilmington, Del., a corporation of Delaware Application December 29, 1942, Serial No. 470,446

5 Claims. (Cl. 260—329)

The present invention relates to new and improved means for the separation of dienes from gas mixtures containing the same and to purification of dienes from impurities.

There are many processes for the preparation of dienes which result in gas mixtures containing a greater or lesser percentage of diene. Accordingly, separation and/or purification is customarily necessary. Since separation and purification are fundamentally the same, the only distinction being in the relative quantity of impurity, these two terms are herein used interchangeably and without distinction throughout the specification and claims. With butadiene-1,3 one of the most important production methods involves the dehydrogenation of normal butane, normal butenes, or mixtures of the two. The C₄ gas mixture so produced will generally contain between about 10 and 50% of butadiene-1,3. Impure butadiene-1,3 is also produced from vinylacetylene and from ethyl alcohol. Accordingly, the purification of conjugated dienes is of substantial importance. The present invention provides means for the separation and purification of low boiling conjugated dienes generally, including not only butadiene-1,3 but also conjugated pentadienes and conjugated hexadienes.

Many systems have been proposed for the purification of dienes. Briefly stated, the known methods are solvent extraction, gas absorption in a solvent, fractional distillation, formation of complexes with cuprous salts, and formation of a non-resinified crystalline sulfone by reaction of the diene with sulfur dioxide, and various combinations of these processes. The methods involving solvent extraction or gas absorption known in the art are inefficient and unless excessive amounts of equipment are used the purity of the butadiene produced will ordinarily not run over about 60%. Fractional distillation to separate butadiene from other C₄ gases is exceedingly expensive and involves high reflux ratios. Neither of these methods will separate conjugated from non-conjugated dienes. Complexes of cuprous salts entail mechanical difficulties. The sulfone system is disadvantageous due to limiting equilibrium conditions and to losses during liberation of the butadiene from the sulfone.

The present invention provides new and novel methods for operating the sulfone purification system whereby the disadvantages encountered heretofore in this system are obviated.

It has heretofore been proposed to react butadiene-1,3 and sulfur dioxide for the production of crystalline sulfones in the presence of an inhibitor, such as pyrogallol or the like, which will prevent the formation of non-crystalline sulfone which is not desired in purification systems. Many such inhibitors are known in the art and all such inhibitors are applicable in the present procedure. Furthermore, it has been proposed to react the conjugated diene and sulfur dioxide for the formation of crystalline sulfone either in gas or liquid phase or in the presence of a solvent. Regardless of the phase or the presence of a solvent the adverse equilibrium constant is not affected. It is possible to shift the equilibrium by increasing the mole ratio of sulfur dioxide to diene and in this way obtain a higher percentage conversion of the diene to sulfone. This procedure results in the necessity of recovering a major portion of the sulfur dioxide from the gases from which only a part of the diene has been recovered. Furthermore, the use of a high mole ratio of sulfur dioxide to diene necessitates the use of a large reactor due to the volume of materials which must be handled. Other disadvantages result from the fact that for a favorable equilibrium constant it is necessary to maintain low temperatures, but at the low temperatures the rate of reaction is so low that exceptionally long times of contact would be necessary. For high rates of reaction it is necessary to go to the higher temperatures. However, at these high temperatures the equilibrium is substantially less favorable than at the low temperatures. Regardless of the presence of solvents the limiting equilibria control.

In accordance with the present invention an impure diene is fed continuously to a fractionating zone. Sulfur dioxide and also, if desired, a solvent for the sulfone are also introduced continuously into the reaction zone. Conditions are maintained in the fractionation zone which result in the formation of a sulfone of the diene. The sulfone is continuously withdrawn from the reaction zone and may desirably be passed to a stripping zone wherein any residual sulfur dioxide or other gases are stripped therefrom. The remaining constituents of the impure diene after removal of the diene, are continuously withdrawn from the fractionating zone and if a solvent is used may desirably be forwarded to a stripping zone in which the gas is stripped from residual solvent, which is returned to the fractionating zone. Also in accordance with the present invention the sulfone is decomposed in the presence of the solvent. After separation of the diene and the sulfur dioxide and, if desired, after a final stripping for a clean-up from higher boiling materials, a high grade of diene is obtained without losses due to side reactions.

As shown in the accompanying drawing, which is a flow sheet of a plant involving the present invention, a C4 cut containing butadiene is introduced into the system through the line 1. A portion of the inhibitor employed, such as pyrogallol or any of the known agents for inhibiting resin formation during preparation of soluble diene sulfones, is introduced through line 2. The sulfur dioxide introduced through line 3 may be employed in any desired proportion. Thus, the advantages of the present invention may be obtained with a molar ratio of sulfur dioxide to butadiene of less than 1. Also, the molar ratio may be run considerably higher than 1, on the order of 5 or more. However, ratios substantially below 1 or much above 2 are not desirable since, when the ratio is below 1, some diene will go through the system and not be recovered, while with ratios above 2 the amount of uncombined sulfur dioxide which must be recovered is multiplied needlessly. Accordingly, it is preferred that the mole ratio of sulfur dioxide to diene be between about 1 and about 2.

This mixture of C4 cut, sulfur dioxide and inhibitor is fed continuously to pump 4 which causes it to flow through heat exchanger 5 for introduction near the lower end of fractionating zone 6 through line 7. The sulfur dioxide and butadiene are in liquid phase in the heat exchanger 5, which results in sulfone formation commencing here. Accordingly, by having the heat exchanger at high temperature in the range above 150° F., advantage may be taken of the high rates of reaction in this range. Into the upper end of fractionating zone 6 there is introduced a mixture of the remaining quantity of inhibitor and the solvent. Introduction of the mixture is effected by means of pump 8. The purpose of introducing the inhibitor both in the upper and lower ends of the reaction zone is to have the best distribution possible of the inhibitor throughout the system.

The solvent should be one in which the sulfone is readily soluble. Within the scope of this invention the butadiene and sulfur dioxide may either be soluble or insoluble in the solvent. Further the solvent should be of such a boiling point or boiling range that it is substantially non-volatile under the conditions maintained in the reaction zone and the decomposing zone. Suitable solvents are xylene, ethyltoluene, trimethylbenzine and other higher boiling aromatic hydrocarbons and petroleum fractions of proper boiling range having a high percentage of aromatics. Other solvents are water, alcohols, and ketones in which case appropriate adjustments of the temperature and pressure conditions are made to maintain the solvent in liquid phase.

The fractionating zone 6 in which the reaction occurs may be of any suitable construction for obtaining intimate contact of a gas and liquid moving countercurrent. For example, it may be either a bubble cap column or be provided with any suitable type of packing. The solvent, together with the soluble sulfone flowing down through the column, leaves the reaction zone 6 and may be introduced into a stripping zone 9. This stripping zone if used should be operated at a lower temperature and pressure than the fractionating zone 6. Gases separated may conveniently be recycled to the intake of pump 4 through line 10. Unreacted gas moving upwardly in the fractionating zone is preferably introduced into a stripping zone 11 wherein any aromatic solvent carried by the unreacted gas is removed, and from which the solvent is returned to the reaction zone. This stripping zone 11 conveniently may comprise the upper portion of the column employed for reaction zone 6. The gas leaving stripping zone 11 by line 12, and which comprises principally butadiene-free C4 hydrocarbons and any excess sulfur dioxide, may be disposed in any desired manner. While this disposal does not form any portion of the present invention, a suitable disposition is to wash it with a solvent for sulfur dioxide, such as water, in washing zone 13, whereby the sulfur dioxide may be recycled to the system and whereby the C4 hydrocarbons may be forwarded to a catalytic dehydrogenation plant. In case little or no excess sulfur dioxide is employed, this washing zone 13 may be dispensed with. If there was a slight excess of butadiene over sulfur dioxide the overhead from fractionation zone 6 may be recycled directly to dehydrogenation without removal of the last traces of butadiene.

The fractionating zone 6 is operated under conditions to effect sulfone formation from the diene present. While temperatures above 75° F. may be employed when using a catalyst which promotes the sulfonation reaction, the rates of reaction between 75° and 150° F. are low in the absence of a catalyst necessitating under these conditions a large fractionating zone in order to obtain complete conversion. It is therefore preferred, particularly in the absence of a catalyst, that a temperature above 150° F. be maintained in the fractionating zone. Generally the temperature during reaction is maintained below about 350° F. in order to minimize side reactions, though higher may be employed at the expense of some of the diene. The pressure must be such as to produce mixed phase (liquid-vapor) of the diene and sulfur dioxide in the column.

The solution of soluble sulfone in the solvent, withdrawn from the stripping zone 9, is forwarded by line 14 to pressure release valve 15 and introduced therefrom through line 16 into decomposing zone 17. As in sulfonating, high rates of decomposition reaction are obtained at elevated temperatures. The solvent sulfone mixture is introduced near the top of the decomposing zone, which may be a packed or bubble capped column. This column is operated preferably at a temperature above about 200° F. The lower end of the column may be operated at a temperature substantially higher than the temperature in the upper end of the column, which latter temperature may drop substantially below 200° F., if desired, though no substantial advantage is obtained thereby. High temperatures may be maintained in the lower end of the column by the use of a heater or the like, whereby traces of both sulfur dioxide and butadiene are effectively stripped from the solvent. The material difference in conditions for reaction to, and decomposition of the sulfone is the pressure upon the zone. Thus, while the reaction zone is operated at an elevated pressure the decomposition zone is operated at a substantially lower pressure. Pressures in the neighborhood of atmospheric are desirable. Higher pressures may likewise be employed in the decomposing zone, though the pressures maintained should be sufficiently low that decomposition results. Slightly elevated pressures are often desirable in order to maintain a relatively low boiling solvent in liquid phase in the decomposing zone. Thus, if a maximum temperature of 300° F. is maintained in decomposition zone 17 and the solvent is ethyltoluene, a slight pressure on the zone is maintained so that the solvent is retained in liquid phase. Solvent, together with any residue or polysulfone, is withdrawn through line 18 from the bottom of decomposing zone 17.

The mixture of butadiene and sulfur dioxide from zone 17 may be separated in any convenient manner. Thus, the sulfur dioxide and butadiene may be separated by a selective solvent, such as water, in washing zone 19. While water has been disclosed in the prior art as a selective solvent for the separation of butadiene from butane and butylene, the sulfur dioxide is very much more soluble in water than the butadiene and effective separation can be made therewith. Solvent, which may be carried in slight amounts by the butadiene-sulfur dioxide mixture is to a large extent removed in zone 19. Any other suitable selective solvent for separating butadiene from sulfur dioxide may be employed in washing zone 19. In case the same solvent is used in zones 6 and 19 bottoms from zone 19 may be recycled directly to the reaction zone. In this event solvent withdrawn from decomposing zone 17 through line 18, after removal of residue, or other suitable purification in zone 20, is introduced into zone 19 for use as solvent therein. Otherwise the purified solvent is recycled directly to reaction zone 6 by line 21.

The butadiene overhead from washing zone 19 is relatively pure. However, a final cleanup is at times desirable, in which case it is forwarded to stripping zone 22, in which heavy residue is separated from the butadiene. This stripping zone is not the equivalent of gas fractionation systems at present in use, which are employed to separate the butadiene from other C4 hydrocarbons. The residue from the stripping zone 22 is present only in extremely small percentage and boils substantialy above butadiene.

The mixture of water and sulfur dioxide from washing zone 19, together with some solvent may be separated in stripping zone 23 and the sulfur dioxide returned by line 24 to the reaction zone.

I claim as my invention:

1. The process which comprises reacting a low boiling conjugated diene with sulfur dioxide to form a less volatile decomposable sulfone in a fractionating zone at temperatures such that the rate of formation of the sulfone is relatively rapid and at pressures such that both sulfur dioxide and said diene are maintained in both liquid and vapor phases, simultaneously fractionally distilling the resulting mixture of decomposable sulfone and unreacted diene and sulfur dioxide in said fractionating zone to effect a downward movement of a liquid phase comprising said decomposable sulfone and an upward movement of a gaseous phase comprising unreacted diene and sulfur dioxide within said fractionating zone, and withdrawing decomposable sulfone from said fractionating zone in an amount greater than the amount formed from said diene and sulfur dioxide at equilibrium conditions.

2. In the separation of a low boiling conjugated diene from other low boiling hydrocarbons by forming a decomposable sulfone of said diene with sulfur dioxide; the process which comprises introducing a hydrocarbon mixture consisting of said low boiling diene and other low boiling hydrocarbons to a fractionating zone, introducing to said fractionating zone sufficient sulfur dioxide to form decomposable sulfone from all of said low boiling diene introduced to said fractionating zone; reacting said low boiling diene with sulfur dioxide to form decomposable sulfone in said fractionating zone at a temperature such that the rate of formation of the sulfone is relatively rapid and at a pressure such that sulfur dioxide, said diene and said other low boiling hydrocarbons are maintained in both liquid and vapor phases; simultaneously fractionally distilling the resulting mixture of decomposable sulfone, unreacted diene and sulfur dioxide and said other low boiling hydrocarbons; removing decomposable sulfone from the bottom of said fractionating zone and removing substantially only said other low boiling hydrocarbons from the top of said fractionating zone.

3. The process of claim 1 wherein a solvent for the decomposable sulfone is continuously passed downwardly through the fractionating zone, said solvent having a volatility such that it remains substantially in the liquid phase under the conditions of temperature and pressure in the fractionating zone, whereby the decomposable sulfone is removed from said fractionating zone in solution in said solvent.

4. The process of claim 3 wherein an inhibitor to prevent the formation of noncrystalline sulfone is continuously introduced to said fractionating zone in solution in said solvent.

5. The process of claim 1 wherein the low boiling diene is butadiene.

FRANK WM. ROSE, Jr.

REFERENCES CITED

The following references are of record in the file of this patent:

UNITED STATES PATENTS

| Number | Name | Date |
|---|---|---|
| 2,395,050 | Hooker et al. | Feb. 19, 1946 |
| 1,651,666 | Buc | Dec. 22, 1922 |